United States Patent [19]

Ando et al.

[11] Patent Number: 6,156,688
[45] Date of Patent: Dec. 5, 2000

[54] REPAIRING MATERIAL FOR BRICKS OF CARBONIZING CHAMBER IN COKE OVEN AND REPAIRING METHOD

[75] Inventors: Takeshi Ando; Michio Homma; Shinjiro Baba; Tadakatsu Kishi, all of Kurashiki; Noboru Komatsubara, Akoh; Shigeru Nakai, Ebina; Teruo Onozawa, Kanagawa-ken; Kazuma Hori, Okayama, all of Japan

[73] Assignees: Kawasaki Steel Corporation, Kobe; Kawasaki Refractories Co., Ltd., Akoh; Taiho Industries Co., Ltd., Tokyo, all of Japan

[21] Appl. No.: 09/203,492

[22] Filed: Dec. 2, 1998

[30] Foreign Application Priority Data

Dec. 5, 1997 [JP] Japan .................................. 9-335246

[51] Int. Cl.[7] .................................................. C04B 35/10
[52] U.S. Cl. .......................... 501/127; 501/128; 501/133; 264/30
[58] Field of Search .............................. 264/30; 501/127, 501/128, 133, 153, 154

[56] References Cited

U.S. PATENT DOCUMENTS 4,143,104  3/1979  Van Konijnenburg et al. .
4,249,947  2/1981  Koga .
4,596,601  6/1986  Rueckl .

FOREIGN PATENT DOCUMENTS 1360183  of 1874  United Kingdom .

OTHER PUBLICATIONS

Derwent Abstracts AN 84–191712, JP 59–107960 (Jun. 22, 1984).

*Primary Examiner*—Paul Marcantoni
*Attorney, Agent, or Firm*—Oblon, Spivak, McClelland, Maier & Neustadt, P.C.

[57] ABSTRACT

A repairing material for the bricks of the carbonizing chamber in a coke oven is obtained by compounding mortar as a main component with a powder comprising 70–100 wt. % of a Co compound, Ni compound, and/or Al compound and 0–30 wt. % of at least one compound selected from among the compounds of Ca, Mg, Zn, Sr, Ba, Fe, V, Pb, Cu, and Ti, and a liquid formed of water, B, P, and at least one member selected from among Si, Na, and K. A method for repairing includes hot applying the repairing material to portions of the bricks of the carbonizing chamber in the coke oven which are in need of repair.

21 Claims, 1 Drawing Sheet

REPAIRING MATERIAL FOR BRICKS OF CARBONIZING CHAMBER IN COKE OVEN AND REPAIRING METHOD

BACKGROUND OF THE INVENTION

1. Field of the Invention

This invention relates to a repairing material for bricks of a carbonizing chamber in a coke oven and a repairing method.

2. Description of the Prior Art

The carbonizing chamber in a coke oven is affected by various factors such as abrasion by the raw material coal, exposure to frequent repetition of cooling and heating cycles, and invasion by carbon. The surface of its bricks therefore sustain peeling and cracking, gradual excoriation of the consequently affected portions, and, eventually, heavily undulating contouring. The refractory bricks which surround the cast iron frame located near the mouth of the oven are particularly susceptible to peeling and cracking and experience severe surface degradation owing to such mechanical factors as the shocks caused by the opening and closing of the oven lid. Since this degrades the airtightness of the carbonizing chamber, it forms a cause for gas leakage and poses a serious problem regarding the quality of the produced coke and the production efficiency.

One approach to this problem is to repair commercial coke ovens by blowing a powder refractory into the broken portions of joints between adjacent bricks or into the fractured portions of the bricks. For example, Japanese Patent Publication Sho 55-46998 teaches a composition using mortar as a main component and incorporating therein a bituminous substance and a liquid oil, Japanese Patent Publication Sho 56-5713 teaches a composition using a basic refractory aggregate (such as magnesia clinker) as a main component and incorporating therein a lithium compound, clay, and sodium silicate, and Japanese Patent Publication Sho 56-15763 teaches a method for effecting repair by using a dry blowing device to hot-blow a powder refractory containing magnesia clinker, for example, as a main component. The repairing materials of these inventions are intended to be used either dry or wet. The methods involved in these inventions invariably rely on the use of a gun or a nozzle to apply a repairing material fed from a pressure tank to the oven wall. In reality, however, inexpensive mortar or a repairing material containing mortar as a main component is used most widely in the repair of coke oven carbonizing chamber bricks.

However, such conventional repairing materials basically exhibit only poor adhesive property to cast iron and bricks (refractory). Since this makes them readily susceptible to peeling and cracking owing to the various factors mentioned above, they fall off the surface of the cast iron and the surface of bricks. The repair with these repairing materials therefore quickly loses its effect and the repair work must be frequently repeated.

The life of the repair work is especially short when the blown repairing material happens to contain much water because the applied layer of the wet repairing material emits steam while drying and the pressure of this steam easily separates the applied layer of the repairing material from the oven wall and the bubbles produced in consequence of the evaporation of the substance having a low melting points easily give rise to cavities which cause cracks in the applied layer.

In the case of the mortar spray which is in popular use, for example, since the mortar has a proper particle size distribution in the approximate range of 0.05 mm—several mm and uses $SiO_2$ and $Al_2O_3$ as main components, the applied layer of this repairing material does not conspicuously give rise to cavities in consequence of the formation of bubbles. The life of the repair work by the mortar spray, however, is only about one week because the mortar exhibits an extremely weak adhesive power to cast iron and bricks.

When the repairing material which contains mortar as a main component as described above is used for repair, the adhesive property is somewhat better than that of the repairing material which is formed solely of mortar. When the solidified applied layer of this repairing material is exposed to repeated cooling and heating cycles, however, it ultimately sustains cracks owing to the repeated cycles of contraction and expansion. When this happens, the tarry matter in the oven enters the cracks and coagulates in the cracks when the applied layer cools. Repetition of this process gradually enlarges the cracks and promotes separation of the applied layer of repairing material from the oven wall.

None of the existing repairing materials using mortar as a main component is found to be capable of providing a lasting repair effect.

SUMMARY OF THE INVENTION

The repairing material of this invention consists in a composition obtained by combining mortar with relatively small amounts of other components. The repairing material of this invention possesses outstanding properties such as high adhesive strength to not only the refractory bricks forming the carbonizing chamber in the coke oven but also the portions near the mouth of the oven where cast iron and refractory bricks make contact, resistance to bubbling and cracking, and long-lived repair effect that is several to some tens of times that obtained with a repairing material formed solely of mortar. This invention further embraces a method for effecting repair by the use of this repairing material.

Specifically, this invention is directed to a repairing material for bricks of the carbonizing chamber in a coke oven, obtained by compounding (a) 100 parts by weight of mortar, (b) 0.1–10 parts by weight of a powder comprising 70–100 wt. % of at least one member selected from the group consisting of Co compound, Ni compound, and Al compound and 0–30 wt. % of at least one member selected from the group consisting of Ca compound, Mg compound, Zn compound, Sr compound, Ba compound, Fe compound, V compound, Pb compound, Cu compound, and Ti compound, and (c) 2–50 parts by weight of a liquid containing Si, at least one member selected from the group consisting of Na and K, B, and P at respective contents in the range of 1–30 wt. % as $SiO_2$, 3–34 wt. % as $Na_2O$ and/or $K_2O$, 1.5–12 wt. % as $B_2O_3$, and 0.3–4 wt. % as $P_2O_5$ and the balance of water.

The invention is also directed to a method for repairing the carbonizing chamber in a coke oven by the use of the repairing material.

DESCRIPTION OF THE PREFERRED EMBODIMENTS

Figure 1:
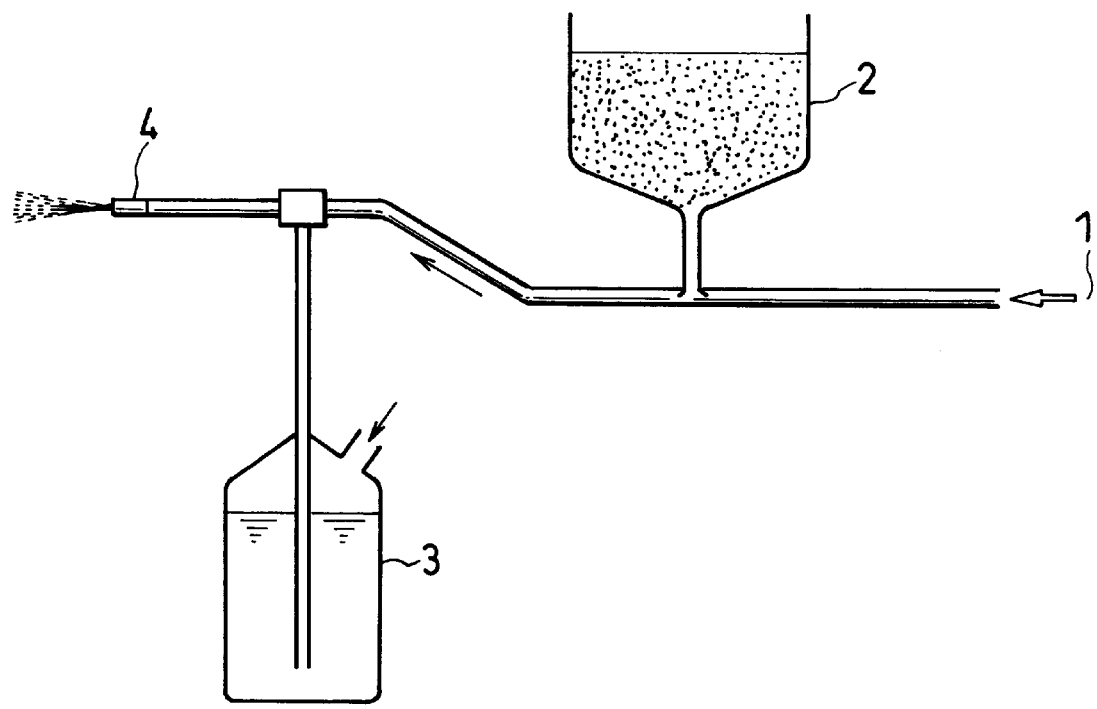
FIG. 1 is a diagram illustrating one example of the apparatus for spraying the repairing material of this invention.

The repairing material of this invention is obtained by compounding 100 parts by weight of the mortar component (a) with 0.1–10 parts by weight of the powder component (b) and 2–50 parts by weight of the liquid component (c). The components (a)–(c) of the composition will be described in detail below.

The reasons for maintaining the compositions and contents of the powder component (b) and the liquid component (c) within the aforesaid ranges is as follows.

When the composition or content of either of components falls outside the specified range, the repaired portion does not satisfy the requirements with regard to such properties as adhesive strength, porosity, compressive strength, elasticity and bulk specific gravity.

One effect of the liquid component (c) is, for example, formation of borosilicate glass that modifies the mortar into a strongly bonded texture.

Although the compressive strength and bending strength of the repaired portion increase with increasing $SiO_2$ content of the liquid component (c), an excessive $SiO_2$ content lowers the adhesive strength thereof.

Conversely, when the $SiO_2$ content is deficient, high adhesive strength is obtained at the sacrifice of compressive strength and bending strength.

Although the $B_2O_3$ and $P_2O_5$ in the liquid component (c) work to lower the glass melting point, excessive amounts of these constituents degrades solubility and causes crystal precipitation and other undesirable effects.

The specified content of $Na_2O$ and/or $K_2O$ is that required for total dissolution of the Si, P and B compounds.

The specified content of the powder component (b) is that necessary for improving the adherence, compressive strength and bending strength of the repaired portion and for obtaining an appropriate coefficient of thermal expansion and an appropriate melting temperature range.

The mortar used as the component (a) in this invention is not particularly limited as to composition. Generally, the mortar is only required to use $SiO_2$ and $Al_2O_3$ as main components and further incorporate therein other components such as $Fe_2O_3$, CaO, MgO, $Na_2O$, and $K_2O$ in suitable contents.

The relation between the composition of the mortar component (a) and the liquid component (c) in the repairing material of this invention is as follows.

When the $SiO_2$ as one of the main components of the mortar accounts for not less than 60 wt. % of the total amount of $SiO_2$ and $Al_2O_3$, namely when the mortar has a $SiO_2$ rich composition, the adhesive property exhibited by the repairing material increases with decreasing $SiO_2$ content of the liquid component (c). Specifically, the $SiO_2$ content of the liquid component (c) is preferred to be not more than 10 wt. %. When the $Al_2O_3$ accounts for not less than 60 wt. % of the total amount of the main components of the mortar, namely when the mortar has an $Al_2O_3$ rich composition, the adhesive property of the repairing material increases with increasing $SiO_2$ content of the liquid component (c). Specifically, the $SiO_2$ content of the liquid component (c) is preferred to be not less than 10 wt. %.

The powder used as the component (b) in this invention comprises 70–100 wt. % of at least one member selected from the group consisting of Co compound, Ni compound, and Al compound and 0–30 wt. % of at least one member selected from the group consisting of Ca compound, Mg compound, Zn compound, Sr compound, Ba compound, Fe compound, V compound, Pb compound, Cu compound, and Ti compound. Typically, $Co(OH)_2$, CoO, $Co_2O_4$, and $Co_2O_3$ may be cited as concrete examples of the Co compound, $Ni(OH)_2$, NiO, $Ni_2O_3$, and $NiCO_3$ as concrete examples of the Ni compound, $AlPO_4$, $Al(PO_3)_3$, $Al(OH)_3$ and $Al_2(SiO_3)_3$ as a concrete example of the Al compound, $Ca(OH)_2$, $CaCO_3$, CaO, $Ca_3(PO_4)_2$, $CaCO_4 \cdot 1/2H_2O$ as concrete examples of the Ca compound, $Mg(OH)_2$, $MgCO_3$, MgO, and $MgSO_4$ as concrete examples of the Mg compound, ZnO and $ZnCO_3$ as concrete examples of the Zn compound, $Sr(OH)_2$, $SrCO_3$, SrO and $SrSO_4$ as concrete examples of the Sr compound, $BaSO_4$, BaO, $BaCO_3$, and $Ba(OH)_2$ as concrete examples of the Ba compound, $Fe_2O_3$, $Fe_3O_4$, and FeOOH as concrete examples of the Fe compound, $V_2O_5$, $NH_4VO_3$ and $V_2O_4$ as concrete examples of the V compound, $Pb_3O_4$, $PbCO_3$ and PbO as concrete examples of the Pb compound, $CuSO_4$, CuO, $CuCO_3$, and $Cu(OH)_2$ as concrete examples of the Cu compound, and $TiO_2$ and $Ti(SO_4)_2$ as concrete examples of the Ti compound.

Among the constituents of the powder component (b), Co compound, Ni compound, and/or Al compound improves the adhesiveness of the repairing material to cast iron, and bonding strength and bending strength of the repairing material after the applied layer of the repairing material solidifies. The addition to one or more of these compounds of one or more of powders of Ca, Mg, Zn, Sr, Ba, Fe, V, Pb, Cu, and Ti compounds decreases the thermal expansion coefficient of the solidified applied layer of the repairing material, expands the range of melting temperature, and enhances the surface hardness of the applied layer of the repairing material.

Since the content of the powder component (b) incorporated is in the range of 0.1–10 parts by weight, based on 100 parts by weight of mortar, the content of the Co compound, Ni compound, and/or Al compound is in the range of 0.07–10 parts by weight and that of the one or more Ca, Mg, Zn, Sr, Ba, Fe, V, Pb, Cu, and Ti compounds is in the range of 0–3 parts by weight.

The composition of the liquid component (c) in this invention may be expressed in terms of oxides as follows.

| | |
|---|---|
| $SiO_2$ | 1–30 wt. %, |
| $Na_2O$ and/or $K_2O$ | 3–34 wt. %, |
| $B_2O_3$ | 1.5–12 wt. %, |
| $P_2O_5$ | 0.3–4 wt. %, and |
| Water | Balance |

This liquid component (c) is an aqueous solution having an alkali salt of silicic acid as a main component, additionally containing an alkali salt of phosphoric acid and an alkali salt of boric acid, and having a melting point of the oxide composition of not higher than 800° C.

Examples of the alkali salt of silicic acid include sodium metasilicate, potassium metasilicate, sodium orthosilicate, potassium orthosilicate and hydrates thereof, water glass No. 1, water glass No. 2, and water glass No. 3, for example. Examples of the alkali salt of phosphoric acid include sodium and potassium salts of tertiary phosphoric acid, secondary phosphoric acid, metaphosphoric acid, pyrophosphoric acid, and polyphosphoric acids (tripolyphosphoric acid and hexametaphosphoric acid), for example. Examples of the alkali salts of boric acid include sodium and potassium salts of metaboric acid, orthoboric acid, and tetraboric acid, the reaction product of boric acid with sodium hydroxide, the reaction product of boric acid with potassium hydroxide, borax and its hydrate.

The liquid component (c) expels the water content thereof by evaporation at elevated temperatures, melts at a temperature not higher than 800° C., enhances the adhesiveness of the repairing material to the refractory bricks and the cast iron, partially fills the cavities occurring in the sprayed layer of the repairing material, improves the air-tight property of the sprayed layer of the repairing material and improves the smoothness of the repaired surface. The oxides which originate in the solution of the liquid component (c) comprise 2–86% of $SiO_2$, 6–92% of $Na_2O$ and/or $K_2O$, 2–74% of $B_2O_3$, and 0.4–42% of $P_2O_5$. The proportions of these oxides to 100 parts of mortar are 0.05–15 parts of $SiO_2$, 0.15–17 parts of $Na_2O$ and/or $K_2O$, 0.075–6 parts of $B_2O_3$, and 0.015–2 parts of $P_2O_5$.

The repairing material of this invention for the bricks of the carbonizing chamber in the coke oven is hot sprayed onto the parts requiring repair under high pressure by the use of a gun or nozzle when the mouth of the oven is open after the expulsion of the produced coke.

As shown in the schematic view of FIG. 1, inlets communicating with a powder container 2 and a liquid container 3 are provided at points along the length of a discharge conduit connected to a compressor 1, and the mortar, the powder component (b), the liquid component (c), and optionally water are discharged in their required amounts into the discharge conduit to form the repairing material of this invention. To effect the required repair, this repairing material has only to be sprayed onto the portions requiring the repair by the use of a spray device provided at the leading end thereof with a nozzle 4. The discharge pressure is in the range of 5–8 kg/cm² and the amount of the material to be sprayed onto the oven wall is in the range of 4–10 kg/m². The repairing material is sprayed onto the bricks to be repaired in an amount to produce an applied layer having a thickness in the range of 10–60 mm, depending on the degree of undulation of the brick surface.

The compositions placed in the powder container 2 and the liquid container 3 will be explained. The following four cases are conceivable:

(1) Powder container 2—mortar Liquid container 3—powder component (b)+liquid component (c)

(2) Powder container 2—mortar Liquid container 3—powder component (b)+liquid component (c)+water (3) Powder container 2—mortar+powder component (b) Liquid container 3—liquid component (c)

(4) Powder container 2—mortar+powder component (b) Liquid container 3—liquid component (c)+water.

In the cases of (1) and (2), the liquid container 3 requires means for preventing the powder component (b) from separating by sedimentation. In the cases of (3) and (4), care must be taken to ensure uniform mixture of the mortar and the powder component (b) in the powder container 2.

The choice regarding whether and how much water should be added is made based on the concentration of the composition of the liquid component (c) and the contents of the three components, i.e. the mortar, powder component (b), and liquid component (c).

EXAMPLE 1

The test pieces were obtained by inserting 40×40×80 mm refractory bricks, in 40×40×160 mm test frames, casting into the remaining ½ space of each test frames one of the repairing materials of Formulations 1–16 and Comparative Formulations 1 and 2 indicated in Table 1 and Table 2, thermally drying the repairing material in an electric oven at 110° C. for 10 hours, and firing the dried repairing material at 900° C. for three hours. The solidified repairing material was tested for adhesive strength and bending strength and rated for quality based on the results of the tests. The mortar used in this Example was composed of 55 wt. % of $SiO_2$, 40 wt. % of $Al_2O_3$, and 5 wt. % of the other components ($Fe_2O_3$, CaO, MgO, $Na_2O$, and $K_2O$).

The adhesive strength is indicated as the magnitude of bending strength measured at the interface between the repairing material and the refractory brick in the test piece.

The test piece was tested for porosity by measuring its gas permeability.

TABLE 1

| | | | Invention Formulation | | | | | | | | |
|---|---|---|---|---|---|---|---|---|---|---|---|
| | | | 1 | 2 | 3 | 4 | 5 | 6 | 7 | 8 | 9 |
| Weight of mortar component (a) | | | 100 | 100 | 100 | 100 | 100 | 100 | 100 | 100 | 100 |
| Weight of powder component (b) | | | 1 | 0.1 | 3 | 5 | 10 | 5 | 2 | 7 | 4 |
| Weight of liquid component (c) | | | 30 | 10 | 50 | 30 | 20 | 40 | 20 | 35 | 10 |
| Powder Component (b) | Powder Composition (%) | Co(OH)$_2$ | | | | | | | | 100 | |
| | | CoO | 100 | | 70 | | 90 | | | | |
| | | Ni(OH)$_2$ | | 100 | | | | 80 | | | |
| | | NiO | | | | | | | 100 | | 80 |
| | | AlPO$_4$ | | | | 80 | | | | | |
| | | CaO | | | | 20 | 10 | | | | |
| | | ZnO | | | 30 | | | | | | |
| | | Fe$_3$O$_4$ | | | | | | | 20 | | |
| | | NH$_4$VO$_3$ | | | | | | | | | 10 |
| | | Pb$_3$O$_4$ | | | | | | | | | 10 |
| Liquid Component (c) | Liquid Composition | Potassium metasilicate | 25 | | | | | | | | |
| | | Sodium orthosilicate | | | | | | | | 20 | |
| | | Water glass No. 1 | | | | 70 | 20 | | | | |
| | | Water glass No. 2 | | | 30 | | | 30 | | | 30 |
| | | Water glass No. 3 | | 40 | | | | | 30 | | |
| | | Sodium secondary phosphate | | | | | 3 | | | | |
| | | Potassium metaphosphate | | | | | | | | | 4 |
| | | Sodium pyrophosphate | 5 | | | 3 | | | 3 | | |
| | | Sodium tripolyphosphate | | 2 | | | | | | | |

TABLE 1-continued

|  |  | Invention Formulation | | | | | | | | |
|---|---|---|---|---|---|---|---|---|---|---|
|  |  | 1 | 2 | 3 | 4 | 5 | 6 | 7 | 8 | 9 |
|  | Potassium tripolyphosphate |  |  |  |  |  |  |  | 5 |  |
|  | Potassium hexametaphosphate |  |  | 3 |  |  | 2 |  |  |  |
|  | Sodium metaborate |  |  |  |  | 20 |  | 20 |  |  |
|  | Sodium orthoborate** | 20 |  | 15 |  |  |  |  |  |  |
|  | Potassium tetraborate* |  | 10 |  |  |  | 15 |  |  | 10 |
|  | Borax |  |  |  | 5 |  |  |  | 15 |  |
|  | Water | 50 | 48 | 52 | 22 | 57 | 53 | 47 | 60 | 56 |
| Amount of liquid component (c) |  | 15.03 | 2.75 | 16.45 | 13.14 | 6.82 | 12.76 | 6.92 | 11.52 | 2.89 |
| ash based on 100 of mortar |  |  |  |  |  |  |  |  |  |  |
| Ash composition (%) |  |  |  |  |  |  |  |  |  |  |
| $SiO_2$ |  | 19.5 | 42.3 | 32.0 | 58.3 | 21.4 | 33.0 | 25.2 | 14.7 | 36.4 |
| $Na_2O$ and/or $K_2O$ |  | 64.3 | 31.6 | 50.1 | 33.8 | 43.3 | 35.1 | 39.6 | 61.4 | 34.6 |
| $P_2O_5$ |  | 5.3 | 4.2 | 5.5 | 3.7 | 4.4 | 3.8 | 4.6 | 7.2 | 8.4 |
| $B_2O_3$ |  | 10.9 | 21.8 | 12.4 | 4.2 | 31.0 | 28.1 | 30.6 | 16.6 | 20.7 |

**Prepared by the reaction of boric acid with NaOH; 72.7 wt. % of $Na_2O$ and 27.3 wt. % of $B_2O_3$.

TABLE 2

|  |  |  | Invention Formulation | | | | | | | Comparative Formulation | |
|---|---|---|---|---|---|---|---|---|---|---|---|
|  |  |  | 10 | 11 | 12 | 13 | 14 | 15 | 16 | 1 | 2 |
| Weight of mortar component (a) |  |  | 100 | 100 | 100 | 100 | 100 | 100 | 100 | 100 | 100 |
| Weight of powder component (b) |  |  | 1 | 5 | 5 | 2 | 3 | 2 | 2.5 |  |  |
| Weight of liquid component (c) |  |  | 30 | 25 | 50 | 30 | 25 | 30 | 40 |  | 20 |
| Powder Component (b) | Powder Composition (%) | $Co(OH)_2$ | 80 |  |  |  |  |  | 70 |  |  |
|  |  | NiO |  | 80 |  | 70 |  |  |  |  |  |
|  |  | $AlPO_4$ |  |  | 80 |  | 70 | 80 |  |  |  |
|  |  | MgO |  | 15 | 20. |  |  |  |  |  |  |
|  |  | $ZnCO_3$ |  |  | 10 |  |  |  |  |  |  |
|  |  | FeOOH |  | 5 |  |  |  |  |  |  |  |
|  |  | $NH_4VO_3$ |  |  | 10 |  |  |  |  |  |  |
|  |  | $SrCO_3$ |  |  |  | 30 |  |  |  |  |  |
|  |  | $BaSO_4$ |  |  |  |  | 30 |  |  |  |  |
|  |  | $Cu(OH)_2$ |  |  |  |  |  | 20 |  |  |  |
|  |  | $TiO_2$ |  |  |  |  |  |  | 30 |  |  |
| Liquid Component (c) | Liquid Composition | Potassium metasilicate | 20 |  |  | 20 |  | 25 |  |  |  |
|  |  | Water glass No. 1 |  | 20 |  |  |  |  |  |  | 30 |
|  |  | Water glass No. 2 |  |  |  |  | 20 |  |  |  |  |
|  |  | Water glass No. 3 |  |  | 10 |  |  |  | 30 |  |  |
|  |  | Sodium secondary phosphate |  |  |  | 2 |  |  |  |  |  |
|  |  | Sodium tertiary phosphate | 5 |  |  |  |  |  |  |  |  |
|  |  | Potassium metaphosphate |  |  |  | 3 |  |  |  |  |  |
|  |  | Potassium hexametaphosphate |  |  |  |  |  | 2 |  |  |  |
|  |  | Sodium pyrophosphate |  | 1 |  |  |  |  | 2 |  |  |
|  |  | Sodium tripolyphosphate |  |  |  |  |  |  | 2 |  |  |
|  |  | Sodium metaborate |  | 5 |  | 18 |  |  | 20 |  |  |
|  |  | Potassium tetraborate |  |  |  |  | 20 |  |  |  |  |
|  |  | Borax | 25 |  | 24 |  |  | 20 |  |  |  |
|  |  | Water | 50 | 74 | 63 | 60 | 58 | 53 | 48 |  | 70 |
| Amount of liquid component (c) |  |  | 11.46 | 4.23 | 9.76 | 11.96 | 7.98 | 11.27 | 13.42 |  |  |
| ash based on 100 of mortar |  |  |  |  |  |  |  |  |  |  |  |
| Ash composition (%) |  |  |  |  |  |  |  |  |  |  |  |
| $SiO_2$ |  |  | 25.8 | 43.2 | 14.9 | 19.6 | 21.9 | 32.8 | 25.9 |  |  |
| $Na_2O$ and/or $K_2O$ |  |  | 44.7 | 38.0 | 30.9 | 54.1 | 36.9 | 45.0. | 39.7 |  |  |
| $P_2O_5$ |  |  | 5.7 | 3.1 | 9.3 | 2.5 | 3.8 | 2.8 | 2.8 |  |  |
| $B_2O_3$ |  |  | 23.9 | 15.7 | 44.9 | 23.9 | 37.4 | 19.4 | 31.5 |  |  |

The results are shown in Table 3.

TABLE 3

|  | Adhesive strength (MN/m$^2$) | Bending strength (MN/m$^2$) | Porosity (%) |
|---|---|---|---|
| Invention Formulation 1 | 2.88 | 9.08 | 28.4 |
| Invention Formulation 2 | 2.52 | 8.24 | 26.8 |
| Invention Formulation 3 | 3.09 | 7.3 | 26.0 |
| Invention Formulation 4 | 4.72 | 8.527.6 |  |
| Invention Formulation 5 | 5.09 | 8.64 | 28.6 |
| Invention Formulation 6 | 8.1 | 9.25 | 27.8 |
| Invention Formulation 7 | 4.14 | 7.38 | 28.0 |
| Invention Formulation 8 | 3.21 | 9.75 | 26.0 |
| Invention Formulation 9 | 2.58 | 6.13 | 25.5 |
| Invention Formulation 10 | 6.17 | 9.55 | 26.7 |
| Invention Formulation 11 | 2.15 | 9.08 | 28.5 |
| Invention Formulation 12 | 7.98 | 9.17 | 26.9 |
| Invention Formulation 13 | 7.62 | 9.43 | 27.3 |
| Invention Formulation 14 | 5.07 | 8.55 | 26.4 |
| Invention Formulation 15 | 6.33 | 9.19 | 26.0 |
| Invention Formulation 16 | 7.21 | 8.87 | 27.0 |
| Comparative Formulation 1 | 0.3 | 4.35 | 27.5 |
| Comparative Formulation 2 | 0.4 | 5.01 | 27.9 |

EXAMPLE 2

The repairing materials of Invention Formulations 1–16 and those of Comparative Formulations 1 and 2 indicated in Table 1 and Table 2 above were prepared by kneading the relevant components and were used to repair the carbonizing chamber of an operating coke oven by way of a field test.

The main specifications of the coke oven used in the field test were as shown below.

1. Number of kilns: 86
2. Size of carbonizing chamber: 6.5 m in height, 420 mm in width, and 15.9 m in length,
3. Time required for one cycle: 23 hours
4. Time for expulsion of produced coke: 5 minutes
5. Temperature of oven wall in carbonizing chamber: 1100–1200° C. in the central part and 900–1100° C. at the kiln mouth.

The repairing material was sprayed by the use of the spray device illustrated in FIG. 1 after the coke produced in the preceding cycle was discharged. The temperature of the oven wall near the kiln mouth while hot was in the approximate range of 500–800° C. and the area of repair was about 100–150 cm from the kiln mouth. Though the thickness of the applied layer of the repairing material was not constant because the repairing material was sprayed to a greater thickness in the valleys remaining after exfoliation, it was generally in the approximate range of 10–60 mm. The amount of the repairing material was in the approximate range of 2–10 kg/m$^2$.

The smoothness of the repaired surface formed was high.

The items inspected were adhesiveness (resistance to separation) of the repairing material to cast iron and bricks and the leakage of gas. Adhesiveness was measured as the number of days between application of the repairing material by spraying and separation of the applied layer and gas leakage as the number of days before the applied layer showed before first sign of gas leakage.

The results are shown in Table 4.

TABLE 4

|  | Number of days before separation of applied layer of repairing material | Number of days before first sign of gas leakage |
|---|---|---|
| Invention Formulation 1 | 64 | 68 |
| Invention Formulation 2 | 56 | 59 |
| Invention Formulation 3 | 69 | 75 |
| Invention Formulation 4 | 105 | 110 |
| Invention Formulation 5 | 113 | 120 |
| Invention Formulation 6 | not less than 180 | not less than 180 |
| Invention Formulation 7 | 92 | 101 |
| Invention Formulation 8 | 71 | 78 |
| Invention Formulation 9 | 57 | 62 |
| Invention Formulation 10 | 137 | 145 |
| Invention Formulation 48 | 51 |  |
| Invention Formulation 12 | not less than 180 | not less than 180 |
| Invention Formulation 13 | 175 | 180 |
| Invention Formulation 14 | 120 | 125 |
| Invention Formulation 15 | 148 | 150 |
| Invention Formulation 16 | 163 | 168 |
| Comparative Formulation 1 | 6 | 7 |
| Comparative Formulation 2 | 10 | 11 |

As can be seen from the foregoing, the invention repairing material for the bricks of the carbonizing chamber in coke ovens exhibited higher adhesive strength to the refractory bricks and to the cast iron frame near the kiln mouth, abounded in resistance to shock, excelled in smoothness of repaired surface, and offered satisfactory resistance to gas leakage as compared with the conventional repairing material.

The repair of the bricks of a carbonizing chamber in a coke oven done by use of the repairing material of this invention, particularly that at the kiln mouth, is thus highly durable.

What is claimed is:
1. A repairing material obtained by compounding
   (a) 62–98 wt. % of mortar comprising $SiO_2$ and $Al_2O_3$ as main components,
   (b) 0.1–6 wt. % of a powder comprising 70–100 wt. % of at least one member selected from the group consisting of a Co compound, a Ni compound, and a Al compound and 0–30 wt. % of at least one member selected from the group consisting of a Ca compound, a Mg compound, a Zn compound, a Sr compound, a Ba compound, a Fe compound, a V compound, a Pb compound, a Cu compound, and a Ti compound, and
   (c) 2–31 wt. % of a liquid containing Si, at least one member selected from the group consisting of Na and K, B, and P at respective contents in the range of 1–30 wt. % as $SiO_2$, 3–34 wt. % as at least one compound selected from the group consisting of $Na_2O$ and $K_2O$, 1.5–12 wt. % as $B_2O_3$, and 0.3–4 wt. % as $P_2O_5$ and the balance of water, wherein
   the weight percentages of the mortar, the powder and the liquid are based on the total amount of the mortar, the powder and the liquid.
2. A repairing material according to claim 1, wherein said Co compound is at least one member selected from the group consisting of $Co(OH)_2$, CoO, $Co_2O_4$, and $Co_2O_3$.
3. A repairing material according to claim 1, wherein said Ni compound is at least one member selected from the group consisting of $Ni(OH)_2$, NiO, $Ni_2O_3$, and $NiCO_3$.
4. A repairing material according to claim 1, wherein said Al compound is at least one member selected from the group consisting of $AlPO_4$, $Al(PO_3)_3$, $Al(OH)_3$ and $Al_2(SiO_3)_3$.

5. A repairing material according to claim 1, wherein said Ca compound is at least one member selected from the group consisting of $Ca(OH)_2$, $CaCO_3$, $CaO$, $Ca_3(PO_4)_2$, and $CaSO_4 \cdot \frac{1}{2}H_2O$.

6. A repairing material according to claim 1, wherein said Mg compound is at least one member selected from the group consisting of $Mg(OH)_2$, $MgCO_3$, $MgO$, and $MgSO_4$.

7. A repairing material according to claim 1, wherein said Zn compound is at least one member selected from the group consisting of $ZnO$ and $ZnCO_3$.

8. A repairing material according to claim 1, wherein said Sr compound is at least one member selected from the group consisting of $Sr(OH)_2$, $SrCO_3$, $SrO$ and $SrSO_4$.

9. A repairing material according to claim 1, wherein said Ba compound is at least one member selected from the group consisting of $BaSO_4$, $BaO$, $BaCO_3$, and $Ba(OH)_2$.

10. A repairing material according to claim 1, wherein said Fe compound is at least one member selected from the group consisting of $Fe_2O_3$, $Fe_3O_4$, and $FeOOH$.

11. A repairing material according to claim 1, wherein said V compound is at least one member selected from the group consisting of $V_2O_5s$, $NH_4VO_3$ and $V_2O_4$.

12. A repairing material according to claim 1, wherein said Pb compound is at least one member selected from the group consisting of $Pb_3O_4$, $PbCO_3$ and $PbO$.

13. A repairing material according to claim 1, wherein said Cu compound is at least one member selected from the group consisting of $CuSO_4$, $CuO$, $CuCO_3$, and $Cu(OH)_2$.

14. A repairing material according to claim 1, wherein said Ti compound is at least one member selected from the group consisting of $TiO_2$ and $Ti(SO_4)_2$.

15. A repairing material according to claim 1, wherein said liquid consists essentially of at least one member selected from the group consisting of alkali salt of silicic acid, alkali salt of phosphoric acid, and alkali salt of boric acid and having an oxide melting point of not higher than 800° C.

16. A repairing material according to claim 15, wherein said alkali salt of silicic acid is at least one member selected from the group consisting of sodium metasilicate, potassium metasilicate, sodium orthosilicate, potassium orthosilicate, and hydrides thereof, water glass No. 1, water glass No. 2, and water glass No. 3.

17. A repairing material according to claim 15, wherein said alkali salt of phosphoric acid is at least one member selected from the group consisting of sodium and potassium salts of tertiary phosphoric acid, secondary phosphoric acid, metaphosphoric acid, pyrophosphoric acid, and polyphosphoric acid (tripolyphosphoric acid and metaphosphoric acid).

18. A repairing material according to claim 15, wherein said alkali salt of boric acid is at least one member selected from the group consisting of sodium salts and potassium salts of metaboric acid, orthoboric acid, and tetraboric acid, the reaction product of boric acid with sodium hydroxide, and the reaction product of boric acid with potassium hydroxide.

19. A method for repairing bricks of a carbonizing chamber in a coke oven, which comprises hot applying the repairing material set forth in claim 1 to the portions of the bricks of the carbonizing chamber in the coke oven which are in need of repair.

20. A repairing material according to claim 1, wherein said mortar comprises 40 wt. % $Al_2O_3$.

21. A method of making a repairing material, the method comprising compounding a mortar, a powder and a liquid; and forming the repairing material of claim 1.

* * * * *